United States Patent
Grosch et al.

(10) Patent No.: US 10,957,923 B2
(45) Date of Patent: Mar. 23, 2021

(54) PREVENTING THE FORMATION OF BLACK ICE AS A RESULT OF EXHAUST WATER FROM MOTOR VEHICLES

(71) Applicant: FORD GLOBAL TECHNOLOGIES, LLC, Dearborn, MI (US)

(72) Inventors: Guenter Hans Grosch, Vettweiss (DE); Thomas Werner Steinkopf, Aachen (DE); Stephan Strahl, Bodenwoehr (DE); Rainer Lach, Wuerselen (DE); Rolf Lorenz Loeffler, Rommerskirchen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 82 days.

(21) Appl. No.: 16/366,619

(22) Filed: Mar. 27, 2019

(65) Prior Publication Data
US 2019/0305342 A1  Oct. 3, 2019

(30) Foreign Application Priority Data

Mar. 29, 2018 (DE) ................ 10 2018 204 828.2

(51) Int. Cl.
*H01M 8/04* (2016.01)
*H01M 8/04223* (2016.01)
(Continued)

(52) U.S. Cl.
CPC ... *H01M 8/04253* (2013.01); *H01M 8/04164* (2013.01); *B60K 13/04* (2013.01); (Continued)

(58) Field of Classification Search
CPC ............. H01M 8/04164; B06Y 2400/202
See application file for complete search history.

(56) References Cited

U.S. PATENT DOCUMENTS 6,403,249 B1 * 6/2002 Reid ................ H01M 8/04097
429/413
6,440,595 B1   8/2002 Herdeg et al.
(Continued)

FOREIGN PATENT DOCUMENTS

DE  102008053800 A1  5/2010
DE  102012006132 A1  10/2013
DE  102015213641 A1  1/2017

OTHER PUBLICATIONS

Fujimoto, A. et al. A road surface freezing model using heat, water and salt balance and its validation by field experiments. Japan. Oct. 2013. 10 pages.
(Continued)

*Primary Examiner* — Jeremiah R Smith
(74) *Attorney, Agent, or Firm* — Brooks Kushman PC; David Kelley

(57) ABSTRACT

A hydrogen fuel cell vehicle system and method inhibit formation of black ice on road surfaces at low temperatures as a result of exhaust water by treating the exhaust water prior to discharge with a deicing or antifreeze substance to lower the freezing point of the water. A metering device may meter a deicing or antifreeze substance, such as sodium chloride, calcium chloride, urea, or the like to be dissolved in the exhaust water that is produced during the production of energy. The vehicle may include a bypass valve that selectively bypasses the water treatment system when ambient conditions are not conducive to ice formation. The bypass valve is operated to direct exhaust flow to a condenser and water treatment system when ambient conditions are favorable to ice formation, with the deicing or antifreeze substance metered based on current or predicted ambient or road surface conditions.

12 Claims, 1 Drawing Sheet

(51) Int. Cl.
*H01M 8/04119* (2016.01)
*B60K 13/04* (2006.01)
*H01M 8/04291* (2016.01)
*H01M 8/04828* (2016.01)

(52) U.S. Cl.
CPC .... *B60Y 2400/202* (2013.01); *H01M 8/04141* (2013.01); *H01M 8/04291* (2013.01); *H01M 8/04828* (2013.01); *H01M 8/04843* (2013.01); *H01M 2250/20* (2013.01)

(56) References Cited

U.S. PATENT DOCUMENTS

| | | | |
|---|---|---|---|
| 6,955,861 B2 | 10/2005 | Yoshizawa et al. | |
| 7,040,430 B2 | 5/2006 | Nomura et al. | |
| 7,537,850 B2 | 5/2009 | Yamada | |
| 7,638,235 B2 | 12/2009 | Druener et al. | |
| 7,645,533 B2 | 1/2010 | Fukuda | |
| 8,029,938 B2 | 10/2011 | Poirot-Crouvezier | |
| 8,695,608 B2 | 4/2014 | Bardelli | |
| 9,054,354 B2 | 6/2015 | Baldini et al. | |
| 9,315,960 B2 | 4/2016 | Kime | |
| 2006/0068240 A1 | 3/2006 | Matoba | |
| 2007/0082245 A1* | 4/2007 | Druenert | B01D 53/228 429/414 |
| 2008/0299432 A1 | 12/2008 | Hoffjann et al. | |
| 2010/0190069 A1* | 7/2010 | Tanaka | H01M 8/0662 429/428 |
| 2011/0207005 A1 | 8/2011 | Schabel | |
| 2015/0273417 A1* | 10/2015 | Hildreth | E01H 10/00 366/137 |

OTHER PUBLICATIONS

Ogburn, Michael James et al. System Integration, Modeling, and Validation of a Fuel Cell Hybrid Electric Vehicle. Blacksburg, Virginia. May 4, 2000. 82 pages.

* cited by examiner

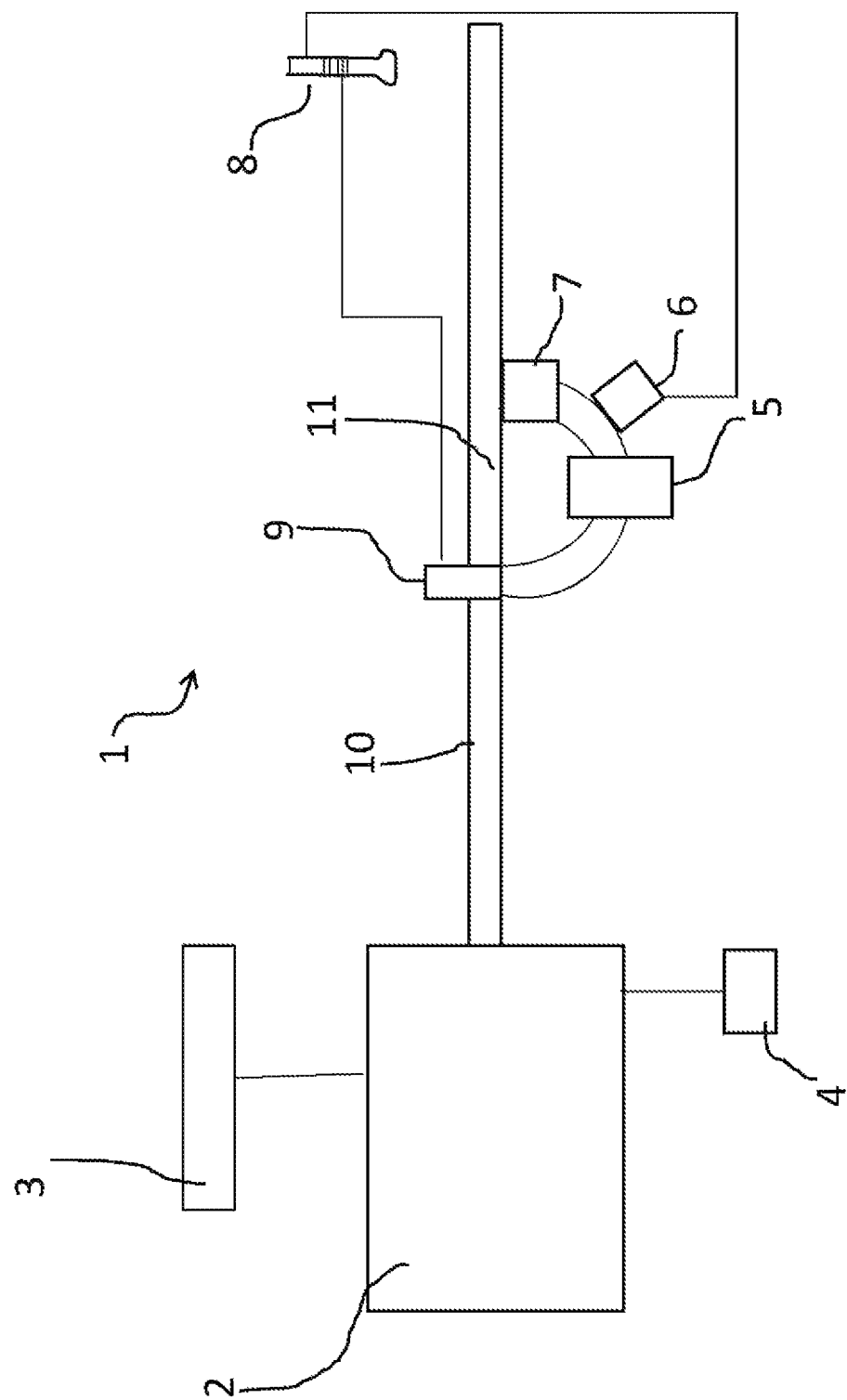

PREVENTING THE FORMATION OF BLACK ICE AS A RESULT OF EXHAUST WATER FROM MOTOR VEHICLES

CROSS-REFERENCE TO RELATED APPLICATIONS

This application claims foreign priority benefits under 35 U.S.C. § 119(a)-(d) to DE Application DE 10 2018 204 828.2 filed Mar. 29, 2018, which is hereby incorporated by reference in its entirety.

TECHNICAL FIELD

The disclosure relates to a vehicle and method for preventing the formation of black ice on road surfaces at low temperatures as a result of exhaust water from the vehicle.

BACKGROUND

Fuel cell vehicles may use hydrogen as a fuel that is reacted with oxygen to release energy used to power the vehicle. Water is formed as a waste product during the reaction between the hydrogen and oxygen. This water is generally discharged into the environment. It is thus possible under suitable ambient conditions for black ice to be formed on a road surface. In particular, if numerous fuel cell vehicles are driven over the same roadway it is thus possible for a collection of water to develop into a hazardous layer of ice. The potential for discharged water to form ice on the road surface may increase where vehicles are stopped, such as at intersections with traffic control devices including stop lights and stop signs, roadways with heavy, slow traffic during rush hours, and any other location where the vehicle may be standing, stopped, or parked for longer periods of time while operating.

It is known for example from DE 10 2008 053 800 A1 to collect the water that is produced. The disclosed system includes an exhaust tract for a fuel cell system having a portion of pipe which is able to conduct the exhaust gas, wherein a collecting vessel is provided for collecting the liquid water that is precipitated from the exhaust gas. The collecting vessel is separated from the portion of pipe in the region where the liquid water is discharged from the collecting vessel. The collecting vessel is connected to the portion of pipe, in the region where the liquid water is discharged, and to at least one connecting pipe and in dependence upon pressures in the portion of pipe and the collecting vessel, said pressures being dependent upon an operating state of the fuel cell system, the liquid water may be conveyed out of the collecting vessel via the connecting pipe. However, it is necessary for the collecting vessel to be sufficiently large that it may receive greater quantities of water over longer journeys and said collecting vessel must be heated in order to prevent it from freezing.

DE 10 2015 213 641 A1 likewise discloses a facility for collecting water that is produced.

DE 10 2012 006 132 A1 circumvents this problem in that the water that is produced is evaporated by being fed to the vehicle heating/cooling system. However, this requires that the vehicle heating/cooling system produces sufficient heat so as to evaporate the water.

SUMMARY

Accordingly, embodiments according to the disclosure provide a simple facility for handling water that is produced by the fuel cell and inhibits or prevents discharged water from freezing on the road surface.

As recognized by the present disclosure, when a de-icing or anti-freeze substance, in particular a salt, is dissolved in the water that is produced, it is possible to discharge the water directly to the roadway without black ice being formed since the freezing point of the water is lowered by dissolving a suitable substance in the water, similar for example to road salt, calcium chloride, magnesium chloride, calcium magnesium acetate (CMA), urea, ethylene glycol, and the like.

The device for this purpose may be integrated in a simple manner into the existing exhaust tract or may be associated with a smaller volume water storage vessel and requires a small amount of space and on account of the small consumption hardly any maintenance.

In other words, substances are dissolved in the exhaust water of vehicles, as a result of which the freezing point is already lowered in the vehicle to the extent that ice is not formed on the road surface.

In particular, salts, such as preferably cooking salt (NaCl) or calcium chloride ($CaCl_2$)), are suitable for this purpose. It is also conceivable to use other substances alone or in combination such as ethanol, glycol, potassium hydroxide, magnesium chloride, calcium magnesium acetate (CMA), urea, ethylene glycol, and the like to the extent it is necessary to lower the freezing point, or depending upon the prevailing temperatures that are conceivable or are to be expected at the relevant location. Thus, a vehicle in Siberia could be filled with a different substance than a vehicle in Germany, for example. It would also be conceivable to provide more than one storage vessel in order to provide a selection of substances according to the prevailing external temperature. Similarly, the deicing or antifreeze substance may be in liquid or solid (dry) form when added to the vehicle. The vehicle system may change the form of the substance prior to mixing with the discharge water, or when added to the discharge water.

Depending upon the measured or predicted external ambient temperature or roadway temperature, it is possible to add sufficient deicing or antifreeze substance to the exhaust water to inhibit or prevent the water freezing on the road surface, until in principle so much substance is dissolved in the exhaust water until a saturated solution is present in which the maximum possible lowering of the freezing point for the respective substance is achieved, for example approx. $-21°$ C. in the case of cooking salt (NaCl).

Such an approach is expedient in particular in the case of fuel cell vehicles that convert hydrogen into oxidation water since greater quantities of exhaust water are produced in that case. Thus, the reaction of 3 kg hydrogen with oxygen produces 27 L of water. To add cooking salt to this quantity of water, similar to sea water, in order to prevent the water freezing at approx. $-2°$ C., only approximately 27 L*0.038 kg salt/L=1.026 kg cooking salt is required.

It is thus possible in accordance with one or more embodiments of the present disclosure for a vehicle having an energy production unit, in particular a fuel cell system that produces exhaust water, and having a discharge system for the exhaust water to comprise a substance metering unit in the discharge system or associated on-board storage reservoir or accumulator in order to dissolve the deicing or antifreeze substance in the water.

The discharge system may be configured to discharge exhaust air and exhaust water from the region of at least of one fuel cell of the fuel cell system.

If the discharge system comprises a cooling unit to condense the exhaust water vapor, it is possible to prevent that condensation and resulting formation of ice within the cooling unit.

If the substance metering unit is connected to an external thermometer and is configured by means of a metering device so as to add sufficient deicing or antifreeze substance to the exhaust or discharge water for dissolving to avoid the water freezing at a prevailing external ambient temperature and/or estimated or predicted road surface temperature, it is possible to react to individual situations and to use a substance only when necessary.

Various embodiments according to the disclosure include a vehicle comprises a hydrogen fuel cell, an exhaust pipe configured to receive water vapor produced by the hydrogen fuel cell, a condenser coupled to the exhaust pipe and configured to condense the water vapor from the hydrogen fuel cell to liquid water, and a metering device associated with the condenser and configured to deliver a substance for mixing with the liquid water that lowers a freezing temperature of the liquid water prior to discharging of the liquid water from the exhaust pipe. The substance may comprise a salt, such as sodium chloride. The vehicle may further include a bypass valve configured to selectively direct the water vapor to the condenser in response to ambient conditions satisfying criteria associated with icing of a road surface. The ambient conditions may comprise ambient temperature. The vehicle may include an ambient temperature sensor configured to measure the ambient temperature. The metering device may be configured to meter the substance for mixing with the liquid water in response to a volume of the liquid water and ambient temperature. The metering device may deliver an amount of the substance for mixing with the liquid water based on the ambient temperature. The vehicle may include a valve coupled to the exhaust pipe and configured to deliver a mixture of the liquid water and the substance to the exhaust pipe.

In one or more embodiments, a vehicle includes a power plant that provides propulsive force for the vehicle and generates water vapor during operation. The vehicle includes an exhaust configured to receive the water vapor generated by the power plant, a bypass valve coupled to the exhaust, a condenser coupled to the bypass valve and configured to condense the water vapor from the exhaust to liquid water, a metering device configured to deliver a substance for mixing with the liquid water that lowers a freezing temperature of the liquid water, and a valve positioned downstream of the metering device and configured to direct a mixture of the liquid water and the substance into the exhaust prior to discharge of the mixture to atmosphere. The bypass valve may direct the water vapor to the condenser in response to ambient temperature being below an associated threshold, and direct the water vapor to atmosphere in response to ambient temperature not being below the associated threshold. The metering device may be controlled to deliver an amount of the substance in response to ambient temperature with the amount of the substance varying as a function of the ambient temperature such that the amount increases as ambient temperature decreases. The vehicle may include a reservoir configured to hold the liquid water, wherein the metering device delivers the substance to the reservoir. The vehicle may also include an ambient temperature sensor.

A method for controlling a vehicle having a hydrogen fuel cell according to one or more embodiments includes selectively directing water vapor from the hydrogen fuel cell to a condenser to condense the water vapor to liquid water in response to ambient temperature being below an associated threshold and adding a substance to the liquid water to lower the freezing temperature of the liquid water prior to discharge from the vehicle. The method may include metering the substance in response to ambient temperature to vary an amount of the substance added to the liquid water, wherein the amount increases as the ambient temperature decreases. The method may also include directing the water vapor from the hydrogen fuel cell to atmosphere in response to the ambient temperature not being below the associated threshold. The substance may comprise a salt. In at least one embodiment, the substance consists essentially of sodium chloride.

Embodiments according to the disclosure may provide various advantages. For example, a discharge water treatment system according to embodiments of the disclosure treats the water produced during operation of a vehicle power plant that produces water vapor to lower the freezing temperature of the water based on current or predicted ambient and/or roadway operating conditions to inhibit or prevent the water from freezing after being discharged from the vehicle. Metering the deicing or antifreeze substance based on ambient temperature reduces the amount of substance required to provide the desired inhibition for freezing. In addition, use of a bypass valve to direct exhaust to atmosphere when ambient conditions are unfavorable for icing of the road surface conserves the on-board substance.

BRIEF DESCRIPTION OF THE DRAWINGS

FIG. 1 is a block diagram of a representative vehicle system having a deicing or antifreeze substance metering device for treating water generated by the vehicle prior to discharge according to various embodiments of the disclosure.

DETAILED DESCRIPTION

As required, detailed embodiments are disclosed herein; however, it is to be understood that the disclosed embodiments are merely representative of the claimed subject matter, which may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter.

FIG. 1 is a block diagram of a fuel cell vehicle 1 having a discharge water deicing or antifreeze system according to various embodiments of the disclosure. The fuel cell vehicle 1 comprises a fuel cell 2 that is supplied with hydrogen from a storage vessel 3 and with compressed air (oxygen) from a compressor 4.

The exhaust air including water vapor is discharged in an exhaust air pipe 10 that conducts the exhaust air out to the environment. A condenser 5 is arranged upstream of the outlet with the result that the water vapor condenses to exhaust water.

A deicing or antifreeze substance is added to this exhaust water by means of a metering unit 6 prior to said exhaust water being discharged via a valve 7 into the environment. In various embodiments, the deicing or antifreeze substance is cooking salt or sodium chloride, which may be in solid (dry) form or dissolved in a saturated solution, for example. To determine the quantity of deicing or antifreeze substance necessary to prevent the exhaust water from freezing on the road surface, the metering unit 6 may be controlled by an associate microprocessor based vehicle controller that receives weather information that may include ambient temperature. In one embodiment, the controller receives weather information from an external thermometer 8 and with the aid of this value meters the required quantity of deicing or antifreeze substance based on the measured or estimated amount of exhaust water.

In addition, in one or more embodiments, a switching valve 9 controls a bypass 11 and the path of the exhaust air via the condenser 5. In the case of current or predicted external temperatures that are not conducive to formation of roadway ice, the exhaust air is subsequently discharged directly into the environment via the bypass 11. In the case of current or predicted ambient and/or roadway conditions conducive to freezing, such as temperatures below 2° C., for example, the controller controls switching valve 9 to route the exhaust via the condenser 5 and the metering unit 6 is activated so as to meter the quantity of deicing or antifreeze substance based on the vehicle and ambient operating conditions, such as the measured or predicted volume of discharge water and the measured or predicted ambient or roadway temperature.

In one or more embodiments, vehicle 1 may include a water reservoir or accumulator to storage exhaust water for more accurate dosing with the deicing or antifreeze substance. The treated water is subsequently discharged to the environment.

As such, embodiments according to the disclosure may provide various advantages. For example, a discharge water treatment system according to embodiments of the disclosure treats the water produced during operation of a hydrogen fuel cell to lower the freezing temperature of the water based on current or predicted ambient and/or roadway operating conditions.

While representative embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a hydrogen fuel cell;
an exhaust pipe configured to receive water vapor produced by the hydrogen fuel cell;
a condenser coupled to the exhaust pipe and configured to condense the water vapor from the hydrogen fuel cell to liquid water;
a switching valve configured to direct the water vapor produced by the hydrogen fuel cell to the condenser in response to ambient conditions satisfying criteria associated with icing of a road surface, and to direct the water vapor produced by the hydrogen fuel cell to atmosphere in response to the ambient conditions not satisfying the criteria; and
a metering device associated with the condenser and configured to deliver a substance for mixing with the liquid water that lowers a freezing temperature of the liquid water prior to discharging of the liquid water from the exhaust pipe.

2. The vehicle of claim 1 wherein the substance comprises a salt.

3. The vehicle of claim 2 wherein the substance comprises sodium chloride.

4. The vehicle of claim 1 wherein the criteria comprise ambient temperature being below an associated temperature threshold.

5. The vehicle of claim 4 further comprising an ambient temperature sensor configured to measure the ambient temperature.

6. The vehicle of claim 1 wherein the metering device is configured to meter the substance for mixing with the liquid water in response to a volume of the liquid water and ambient temperature.

7. The vehicle of claim 1 wherein the metering device delivers an amount of the substance for mixing with the liquid water based on ambient temperature.

8. The vehicle of claim 1 further comprising a valve coupled to the exhaust pipe and configured to deliver a mixture of the liquid water and the substance to the exhaust pipe.

9. A vehicle comprising:
a fuel cell that generates water vapor during operation;
an exhaust configured to receive the water vapor generated by the fuel cell;
a bypass valve coupled to the exhaust;
a condenser coupled to the bypass valve and configured to condense the water vapor from the exhaust to liquid water;
a metering device configured to deliver a substance for mixing with the liquid water that lowers a freezing temperature of the liquid water; and
a valve positioned downstream of the metering device and configured to direct a mixture of the liquid water and the substance into the exhaust prior to discharge of the mixture to atmosphere, wherein the bypass valve directs the water vapor to the condenser in response to ambient temperature being below an associated threshold and directs the water vapor to atmosphere in response to the ambient temperature not being below the associated threshold.

10. The vehicle of claim 9 wherein the metering device is controlled to deliver an amount of the substance in response to ambient temperature.

11. The vehicle of claim 9 further comprising a reservoir configured to hold the liquid water, wherein the metering device delivers the substance to the reservoir.

12. The vehicle of claim 9 further comprising an ambient temperature sensor.

* * * * *